(12) United States Patent
Bain et al.

(10) Patent No.: US 9,246,549 B2
(45) Date of Patent: Jan. 26, 2016

(54) DIELECTRIC RESONATOR DRIVEN NEAR FIELD TRANSDUCER

(71) Applicant: Carnegie Mellon University, Pittsburgh, PA (US)

(72) Inventors: James A. Bain, Pittsburgh, PA (US); Matthew J. Chabalko, Pittsburgh, PA (US); Tuviah E. Schlesinger, Pittsburgh, PA (US); Yi Luo, Pittsburgh, PA (US); Yunchuan Kong, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 222 days.

(21) Appl. No.: 13/969,307

(22) Filed: Aug. 16, 2013

(65) Prior Publication Data

US 2014/0050486 A1 Feb. 20, 2014

Related U.S. Application Data

(60) Provisional application No. 61/742,732, filed on Aug. 17, 2012.

(51) Int. Cl.
*H01S 3/00* (2006.01)
*H04B 5/00* (2006.01)

(52) U.S. Cl.
CPC ............. *H04B 5/00* (2013.01); *Y10T 29/49021* (2015.01)

(58) Field of Classification Search
CPC ............................ H04B 5/00; Y10T 29/49021
USPC ........................................................ 359/346
See application file for complete search history.

(56) References Cited

U.S. PATENT DOCUMENTS

| 8,248,891 B2 * | 8/2012 | Lee et al. ................... 369/13.17 |
| 8,913,468 B1 * | 12/2014 | Peng .......................... 369/13.33 |
| 2005/0289576 A1 * | 12/2005 | Challener .................... 720/658 |
| 2011/0299080 A1 * | 12/2011 | Peng ........................... 356/364 |

* cited by examiner

*Primary Examiner* — Mark Hellner
(74) *Attorney, Agent, or Firm* — Fish & Richardson P.C.

(57) ABSTRACT

An optical device includes a near field transducer; and a dielectric resonant structure coupled to the near field transducer; wherein the dielectric resonant structure comprises a dielectric material that decreases a dissipation of energy in the dielectric resonant structure, relative to other dissipations of energy associated with other materials; and wherein the decrease in the dissipation of energy increases an efficiency of energy transfer from the near field transducer to a target structure, relative to other efficiencies of energy transfer from the near field transducer to the target structure.

36 Claims, 12 Drawing Sheets

DIELECTRIC RESONATOR DRIVEN NEAR FIELD TRANSDUCER

CROSS-REFERENCE TO RELATED APPLICATIONS

This application claims the benefit of priority under 35 U.S.C. §119(e) to provisional U.S. Patent Application No. 61/742,732, filed on Aug. 17, 2012, the entire contents of which are hereby incorporated by reference.

FIELD OF USE

The present disclosure relates to a resonant structure coupled to a near field transducer.

BACKGROUND

Magnetic recording on hard disk drives is accomplished by magnetizing regions of alternating magnetic polarity on a rotating disk through the use of a magnetic recording head. Traditional magnetic recording heads may include a standard electromagnetic coil to generate the alternating magnetic fields required for writing.

Innovations in magnetic recording have been focused on shrinking the size of the magnetized regions of hard disk drives, thereby increasing the number of magnetized regions (or "recording density" per unit area) and the amount of information that can be stored on a given hard disk drive. As recording density of hard disk drives increase, the tendency of the magnetized regions of the hard disk drives to become destabilized by ambient thermal energy may increase. The phenomenon whereby a small magnet flips rapidly back and forth in response to ambient thermal energy is called superparamagnetism, and the limit on magnetic recording density due to superparamagnetism is often referred to as the superparamagnetic limit. To increase the superparamagnetic limit, the magnetic energy density within the magnetized regions may be increased by using materials with higher magnetic energy density. However, a higher magnetic field may be needed to write on these materials—typically one that is greater than that which can be generated with a traditional magnetic recording head.

To generate the higher magnetic field needed to write on materials with higher magnetic energy density, heat assisted magnetic recording (HAMR) and thermally assisted recording (TAR) has been developed. In HAMR and TAR, a nanoscale heating source is added to the magnetic recording head. This heat source is used to heat the recording medium and temporarily reduce the switching field that the recording head must provide to write on the recording medium. After the writing process is complete, the recording medium cools and is no longer subject to thermal destabilization.

The heated spot size should be well below that which can be achieved through the far field focusing of light, as limited by diffraction. Consequently, metallic guiding structures, such as near field transducers (NFTs), are typically used in HAMR systems. NFTs may exploit plasmonic electromagnetic modes to localize optical energy to a sufficiently small spot. NFTs may be illuminated directly, via waveguides or focused light, or they may be attached to resonant structures that can generate or absorb incident radiation and drive the NFTs. Conventional resonant structures that have been used to drive NFTs have been metallic, but the dissipation in the metals limited the energy storage capability of the metallic resonator. NFTs have also been placed directly on the output facet of a laser, such that near field optical coupling can be used to drive the NFTs.

SUMMARY

The present disclosure describes an optical device for exciting the highly localized plasmonic modes of a metallic guiding structure by coupling the guiding structure to a dielectric structure operated at optical resonance. As compared to metallic structures, dielectric structures may allow for higher quality factor in resonance, which will raise the efficiency of the excitation process. In some implementations, the dielectric structure may include a laser cavity filled with an optical gain medium, which vastly simplifies the excitation process, and may be pumped to the point of stimulated emission by either optical or electrical means.

In one aspect of the disclosure, an optical device comprises a near field transducer; and a dielectric resonant structure coupled to the near field transducer; wherein the dielectric resonant structure comprises a dielectric material that decreases a dissipation of energy in the dielectric resonant structure, relative to other dissipations of energy associated with other materials; and wherein the decrease in the dissipation of energy increases an efficiency of energy transfer from the near field transducer to a target structure, relative to other efficiencies of energy transfer from the near field transducer to the target structure.

Implementations of the disclosure may include one or more of the following features. The near field transducer comprises one or more of a gold material, silver material, and copper material. The dielectric resonant structure comprises a first planar surface, a second planar surface, and one or more sides extending between the first planar surface and the second planar surface; wherein the near field transducer is coupled to at least one of the one or more sides of the dielectric resonant structure, with a longitudinal direction of the near field transducer extending perpendicularly from the at least one of the one or more sides of the dielectric resonant structure; and wherein a distance between the near field transducer and the first planar surface is in a range between 80% and 120% of a distance between the near field transducer and the second planar surface. The distance between the near field transducer and the first planar surface is approximately equal to the distance between the near field transducer and the second planar surface. The dielectric resonant structure comprises an exterior planar surface and the near field transducer is coupled to the exterior planar surface, and wherein a longitudinal direction of the near field transducer is substantially parallel to a plane of the exterior planar surface. The dielectric resonant structure comprises a semiconductor gain material. The semiconductor gain material comprises one or more of aluminum, gallium, indium, and arsenic. The semiconductor gain material comprises aluminum gallium arsenide layered with gallium arsenide. The dielectric resonant structure comprises one or more gaps within the semiconductor gain material, with the one or more gaps filled with the dielectric material. The dielectric resonant structure comprises one or more metallic nanostructures within or adjacent to the semiconductor gain material. The dielectric material forms a dielectric cladding having a refractive index that is lower than a refractive index of the semiconductor gain material, with the semiconductor gain material being suspended in the dielectric cladding, and with a quality factor of the dielectric resonant structure being based on a contrast between the refractive index of the dielectric cladding and the refractive index of the semiconductor gain material. The semiconductor gain material comprises a matrix and one or more quantum particles within the matrix, the matrix comprises gallium arsenide, at least one of the one or more quantum particles comprises indium arsenide, at least one of the one or more quantum particles absorbs light at a first wavelength and emits light at a second wavelength, the first wavelength differing from the second wavelength, the second wavelength comprises a wavelength corresponding to a resonant optical mode, and the dielectric resonant structure is operated at the resonant optical mode by exciting the one or more quantum particles using an external light source to provide light to the dielectric resonant structure. The dielectric material comprises one or more of silicon, silicon nitride, aluminum nitride, and tantalum oxide. The target structure is a heat assisted magnetic recording medium. The optical resonator device comprises a microcavity laser. The optical device further comprises a first electrical lead attached to a first surface of the dielectric resonant structure; and a second electrical lead attached to a second surface of the dielectric resonant structure, with the dielectric resonant structure being operated at a resonant optical mode by providing one of a current or a voltage to the dielectric resonant structure using the first electrical lead and the second electrical lead. The dielectric resonant structure is operated at a resonant optical mode by laterally transferring electromagnetic energy to the dielectric resonant structure from a dielectric waveguide that is positioned adjacent to the dielectric resonant structure. The dielectric resonant structure is configured to operate at a resonant optical mode that excites plasmonic modes of the near field transducer to transfer energy along a longitudinal direction of the near field transducer into a region of the target structure. A wavelength of the resonant optical mode is based on a dimension of the dielectric resonant structure. The region of the target structure has an average size less than 200% of a cross-sectional size of the near field transducer. The region has an average size less than 50% of a cross-sectional size of the near field transducer. An average cross-sectional size of the near field transducer is 20 nm by 20 nm, and the average size of the region is in a range between 30 nm and 40 nm. An energy transferred along the longitudinal direction of the near field transducer is in a range between 6% and 30% of an energy produced by the dielectric resonant structure, and an energy transferred into the region is in a range between 6% to 10% of the energy produced by the dielectric resonant structure. The dielectric resonant structure has an average thickness of 255 nm and an average diameter of 2.1 microns. The dielectric resonator structure comprises a resonant cavity. The dielectric material has an average refractive index greater than 1.50.

In another aspect of the disclosure, a method for fabricating an optical device comprises depositing a first metal layer onto a substrate; patterning the first metal layer to form a first metal electrode to electrically drive the optical resonator device; bonding a gain medium layer to the first metal electrode; patterning the gain medium layer to form a resonant cavity, wherein the resonant cavity comprises a material that decreases a dissipation of energy in the resonant cavity, relative to other dissipations of energy associated with other materials, wherein the decrease in the dissipation of energy increases an efficiency of energy transfer from a near field transducer to a target structure, relative to other efficiencies of energy transfer from the near field transducer to the target structure, and wherein the material comprises one or more of a dielectric material and a gain material; depositing a second metal layer onto the resonant cavity; patterning the second metal layer to form the near field transducer on at least a portion the resonant cavity; depositing a transparent conductor onto the resonant cavity and onto the near field transducer that is on at least the portion of the resonant cavity; patterning the transparent conductor; depositing a third metal layer on the transparent conductor; and patterning the third metal layer to form a second metal electrode to electrically drive to optical resonator device.

Implementations of the disclosure may include one or more of the following features. The gain material comprises a semiconductor material. The semiconductor material comprises one or more of aluminum, gallium, indium, and arsenic. The dielectric material comprises one or more of silicon nitride, aluminum nitride and tantalum oxide. The gain medium layer comprises a gallium arsenide matrix with indium arsenide quantum particles. The gain medium layer comprises quantum well layers of gallium arsenide and aluminum gallium arsenide. The method further comprises growing the gain medium layer on a carrier wafer; and removing the carrier wafer after bonding the gain medium layer to the first metal electrode. Bonding the gain medium layer to the first metal electrode comprises bonding the gain medium layer using a thin conductive bond. The transparent conductor comprises indium tin oxide. The method is performed by a fabrication device.

Details of one or more implementations are set forth in the accompanying drawings and the description below. Other features, objects, and advantages will be apparent from the description, the drawings, and the claims.

DETAILED DESCRIPTION

Figure 1:
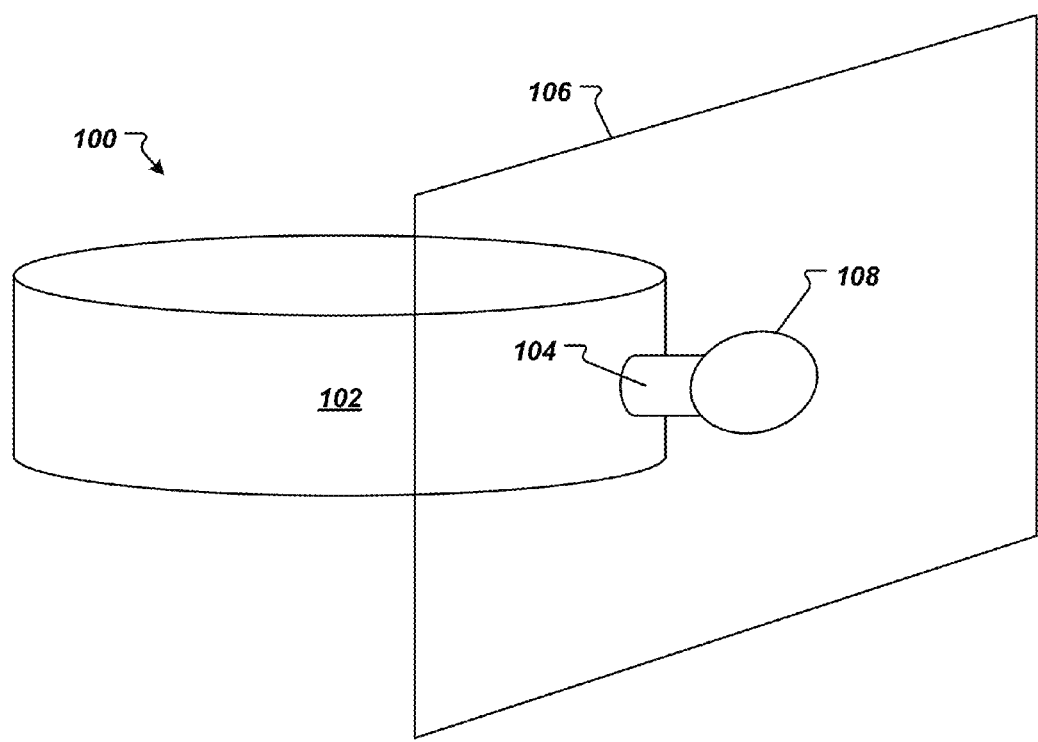
FIG. 1 is a block diagram showing an example of an optical resonant structure coupled to a near field transducer.

FIG. 1 is a block diagram showing an example of an optical device 100. The optical device 100 may include a resonant structure 102 and a near field transducer (NFT) 104.

In some implementations, the resonant structure 102 may be in the form of a cylindrical cavity or disk, as shown. In some implementations, the resonant structure 102 may be in the form of an elongated rectangle. In some implementations, the resonant structure 102 may include a dielectric material. The dielectric material may include, for example, silicon, silicon nitride, aluminum nitride, tantalum oxide, or another dielectric material with a refractive index sufficiently high relative to its surroundings to support optical modes (e.g., a refractive index greater than 1.50). The dielectric material may decrease a dissipation of energy in the resonant structure 102, relative to other dissipations of energy associated with other materials. The decrease in the dissipation of energy may increase an efficiency of energy transfer from the NFT 104 to a target structure 106, relative to other efficiencies of energy transfer from the NFT 104 to the target structure 106. In some implementations, the resonant structure 102 may include a semiconductor material that is less lossy than metal material. The semiconductor material may be referred to as a dielectric since it is less lossy than metal material and more conductive than an insulator. The semiconductor material may include, for example, gallium arsenide, aluminum gallium arsenide, cadmium selenide, or another semiconductor material suitable as an optical gain medium. The semiconductor material may be suspended in a cladding of dielectric material that has a lower refractive index than the semiconductor material. The resonant structure 102 may be excited to the point of stimulated emission either optically or electrically.

In some implementations, the NFT 104 may be in the form of a peg. In some implementations, the NFT 104 may have a cross section that is tapered with a narrower cross section near the resonant structure relative to the cross section of the NFT at the opposite end. In some implementations, the NFT 104 may have an undulated cross section. The NFT may have a cross-sectional dimension up to 500 nm and a length up to 5000 nm.

In some implementations, the NFT 104 is attached to the resonant structure 102. In some implementations, the NFT 104 is placed in proximity to, but not in contact with, the resonant structure 102. The NFT 104 may include a metallic material. The metallic material may include, for example, a gold material, a silver material, a copper material, an alloy combination, or other materials with a relatively large negative real part of the dielectric constant (e.g., a transparent conductor such as indium tin oxide).

In some implementations, the NFT 104 may be coupled to a side of the resonant structure 102, with a longitudinal direction of the NFT 104 extending perpendicularly from the side of the resonant structure 102. In some implementations, a distance between the NFT 104 and a top face of the resonant structure 102 may be in a range between 80% and 120% of (e.g., approximately equal to) a distance between the NFT 104 and a bottom face of the resonant structure 102. For example, the NFT 104 may be positioned halfway between the top face and the bottom face of the resonant structure 102. In some implementations, the NFT 104 may be coupled to or near the top face or the bottom face of the resonant structure 102. For example, the NFT 104 may be coupled to the top face of the resonant structure 102, with a portion of the NFT 104 extending past an edge of the top face. As another example, the NFT 104 may be coupled to a side of the resonant structure 102 near the bottom face of the resonant structure 102 such that a distance between the NFT 104 and the bottom face of the resonant structure 102 may be in a range between 0% and 5% of a distance between the NFT 104 and the top face of the resonant structure 102.

The resonant structure 102 may be operated at optical resonance to excite the highly localized plasmonic modes of the NFT 104. The coupling between the resonant optical mode within the resonant structure 102 and the NFT 104 allows electromagnetic energy to be driven at optical frequencies from the resonant structure to the target structure along the NFT 104, while maintaining localization of the electromagnetic energy to within the cross-sectional dimension of the NFT 104. The tightly confined nature of the electromagnetic field around the cross-sectional dimension of the NFT 104 may allow for coupling of optical energy or power from the resonant structure 102, through the length of the NFT 104, across a small air gap (e.g., an air gap of approximately 5 nm) between the NFT 104 and a target structure 106, and into the target structure 106, creating a localized hot spot 108 in the target structure 106. The optical energy transferred across the air gap is dissipated as heat within the target structure 106 through resistive losses in the target structure 106.

The target structure 106 may be, for example, a heat assisted magnetic recording (HAMR) medium. The target structure 106 may have thermal and magnetic responses designed to operate with the NFT 104.

To compute resonant wavelengths of optical modes supported by a given resonant structure, numerical eigenmode analysis may be performed to compute eigenvalues associated with the optical modes supported by a particular geometry of the resonant structure. Numerical eigenmode analysis provides the resonant wavelengths of the optical modes and the quality (Q) factor of the resonant structure. The Q factor may represent a measure of an optical mode's sustainability. Optical modes with higher Q factors may more likely be driven when exciting the resonant structure containing optical gain material because less energy is lost per cycle relative to an amount of energy that is stored in the resonant structure (resulting in a higher degree of positive feedback).

Numerical eigenmode analysis may also provide the electromagnetic mode structure (e.g., electric and magnetic field profiles) of the resonant structure at the resonant wavelengths. Based on the electromagnetic field profiles, net power flows can be computed. By monitoring the amount of power that is dissipated (resistive losses) in the optical device 100 or where it leaves (radiation losses) the optical device 100, a relative fraction of the power that is dissipated in the target structure 106 may be determined. The power delivered along the NFT 104 across the air gap between the NFT 104 and the target structure 106, and dissipated in the target structure 106 represents the energy delivered to the target structure 106.

Numerical eigenmode analysis of lossless dielectric structures may be used to represent the behavior of an actual physical optical device under one of two conditions. The first condition would be that the lossless dielectric structures are lasing, in which case a single mode may be driven. Under the first condition, energy gain balances energy loss within the resonant structure, so as to yield a net real index of refraction in a dielectric gain material of the resonant structure. The second condition is the case of a passive resonant structure where one particular optical mode is excited via tailored input stimulus. Under the second condition, dielectric material of the resonant structure would also have a real index of refraction (e.g., be lossless), as the dielectric material would lack gain properties.

Figure 2:
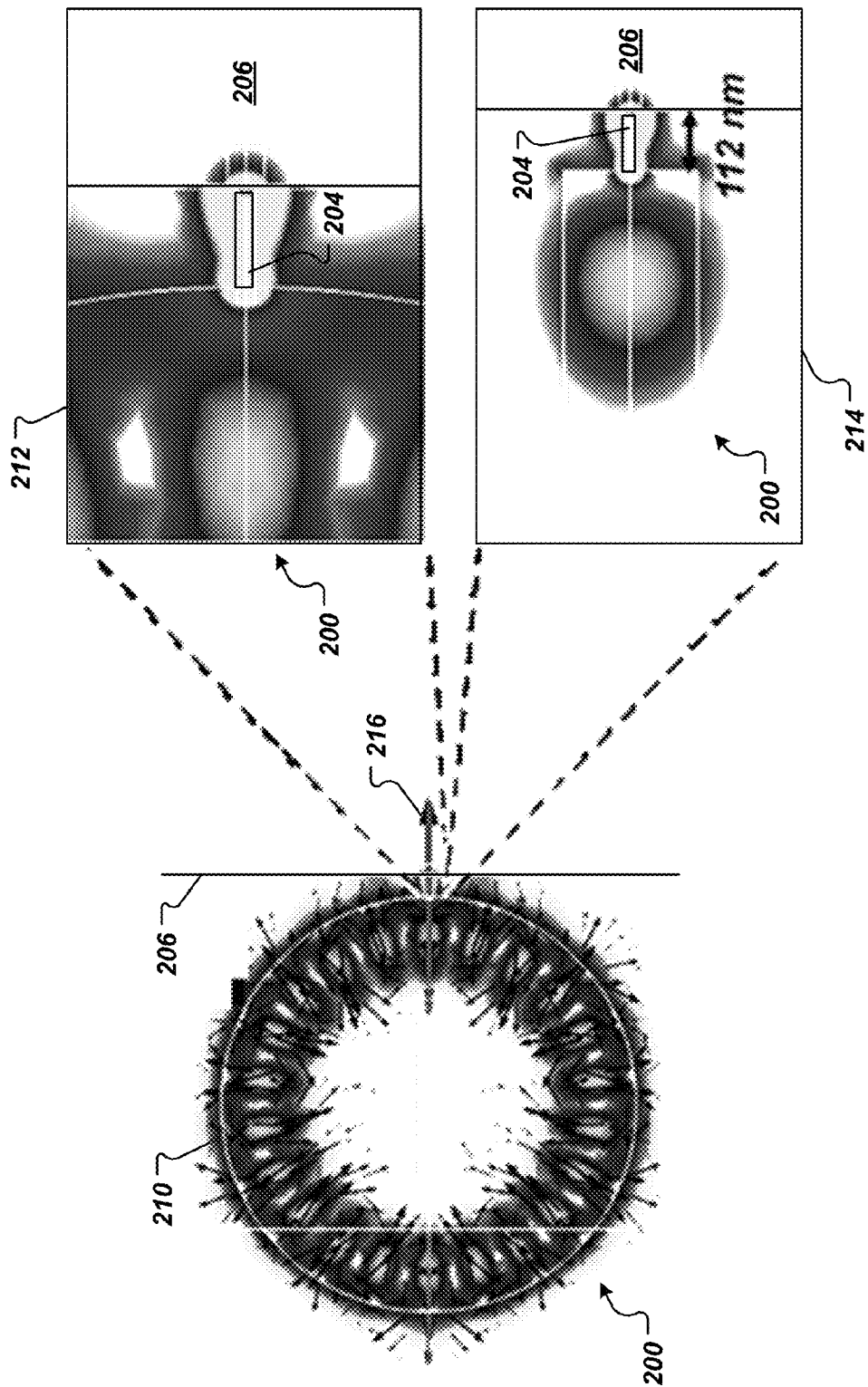
FIG. 2 shows graphs of a computation of a characteristic electromagnetic mode of an optical resonant structure.

FIG. 2 shows graphs 210, 212, 214 of a computation of a characteristic electromagnetic mode, indexed as the $TE_{1,11}$ mode, of a resonant structure, e.g., the resonant structure 102 of FIG. 1. Graph 210 depicts a top view of the optical device 200. Graph 212 depicts a top view of the optical device 200 with a close-up on a NFT 204 of the optical device 200. Graph 214 depicts a side view of the optical device 200 with a close-up on the NFT 204. In graphs 210, 212, 214, the shaded areas indicate electric field magnitude |E|. Increasing lightness of the shaded areas indicates increasing electric field magnitude. Directions of arrows 216 indicate directions of the electric field, and lengths of the arrows 216 indicate the log of the electric field magnitude. Graph 212 and 214 show a large electric field around the NFT 204 and localization of the electric field in a target structure 206.

Variations in the dimensions of a resonant structure of an optical device affect the resonant wavelength of the resonant structure. The resonant wavelength can be tuned to any desired wavelength by varying either the height of the resonant structure or the diameter of the resonant structure. For example, the resonant structure may have a diameter in a range of 1 micrometer to 100 micrometers and an average thickness of less than 1 micrometer. These two degrees of freedom can be used to place the resonant wavelength of a desired optical mode at a desired location within the resonant structure. For a resonant structure that includes a semiconductor gain material, the desirable location may be within a peak of the photoluminescence spectrum from the gain material of the resonant structure.

Figure 3:
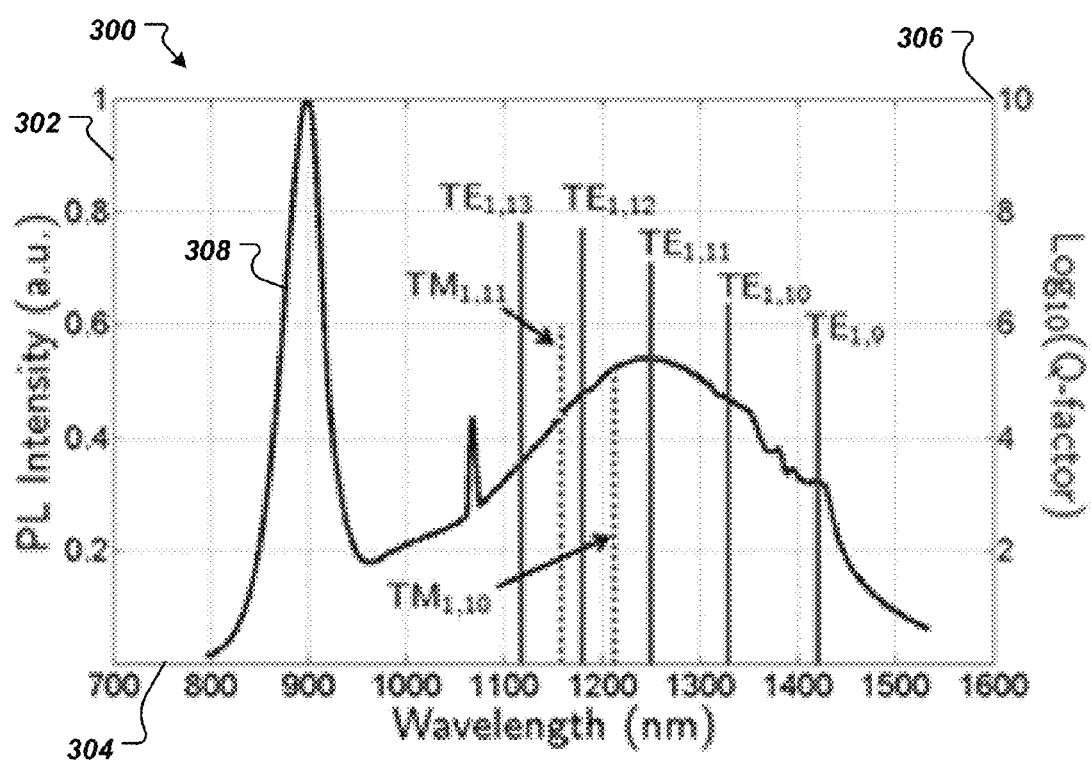
FIG. 3 is a graph showing examples of photoluminescence intensity from a gain material for driving an optical mode of a resonant structure and calculated resonant wavelengths of optical modes supported by a resonant structure.

FIG. 3 is a graph 300 showing examples of photoluminescence intensity from a gain material for driving an optical mode of a resonant structure and the computed resonant wavelengths of optical modes supported by a resonant structure. The resonant structure used to obtain the measurements may have a cylindrical shape that is 2.1 μm in diameter and 255 nm in height. The resonant structure may include a gallium arsenide matrix with indium arsenide quantum particles or dots used as gain material for driving the optical mode of the resonant structure and reinforcing the desired optical mode. The emission wavelength (free space) of the quantum particles may be approximately 1200 nm.

The graph 300 includes axis 302, axis 304, and axis 306. Axis 302 shows a measure of the photoluminescence intensity in a range between 0 a.u. and 1 a.u. Axis 304 shows a measure of optical wavelength in a range between 700 nm and 1600 nm. Axis 306 shows a measure of the Q factor of optical modes at the wavelengths.

FIG. 3 includes a curve 308 depicting a photoluminescence intensity measured from the quantum particles. Curves for $TM_{1,10}$, $TM_{1,110}$, $TE_{1,9}$, $TE_{1,10}$, $TE_{1,11}$, $TE_{1,12}$, and $TE_{1,13}$ optical modes show resonant wavelengths of the optical modes supported by the resonant structure. The $TE_{1,11}$ mode was tuned to be resonant near a peak emission of the quantum particles, as indicated by a peak in the curve 308.

Profile of an optical mode interacting with a NFT can be controlled through the design of the resonant structure. For a resonant structure having rotational symmetry, the electric field produced by the resonant structure can either bypass the NFT or align along the NFT. The optimal configuration is the electric field aligning along the NFT so that the electric current is driven through the NFT across the air gap between the NFT and the target structure and into the target structure with sufficient localization of power. The suboptimal configuration is the electric field bypassing the NFT since such configuration may lead to broad heating of the target structure. Because of the desired output coupling to the NFT, the optimal configuration may have a lower Q factor than the suboptimal configuration.

Figure 4:
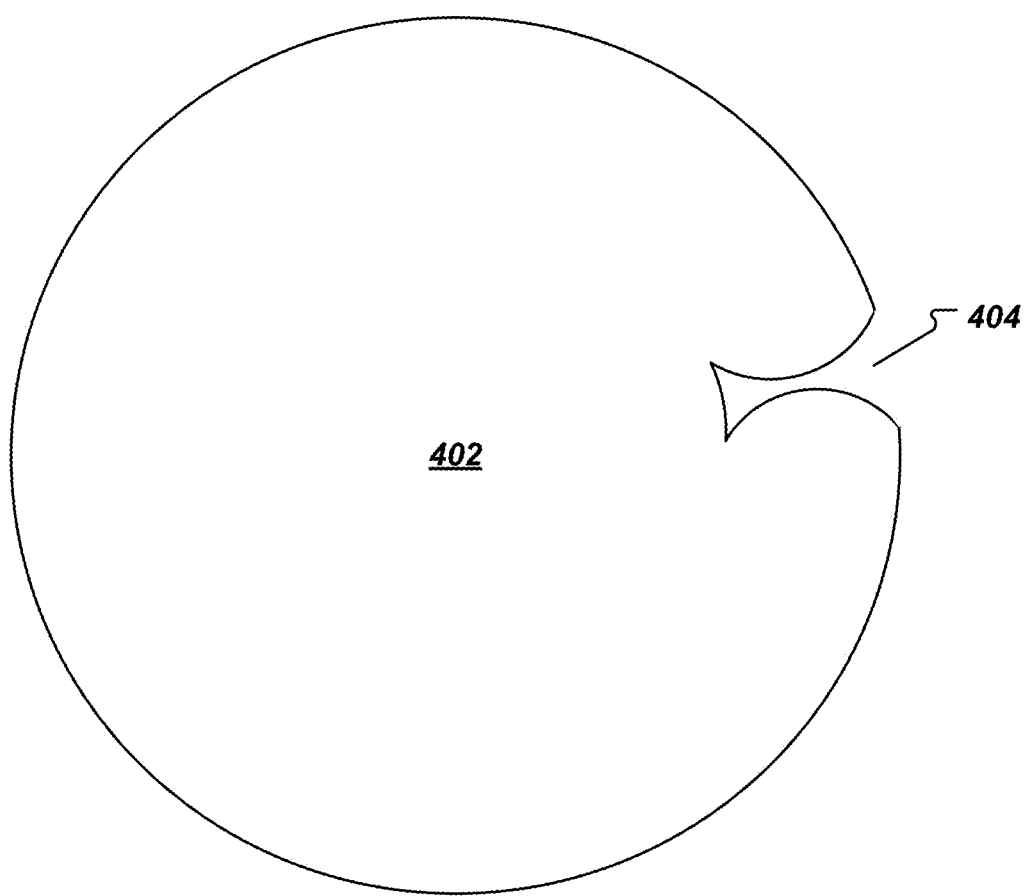
FIG. 4 shows a block diagram of an example of a resonant structure with a small cut at a side of the resonant structure.

To convert a suboptimal configuration to an optimal configuration of the electric field, rotational symmetry of the resonant structure may be broken by introducing a cut or a gap into the resonant structure. Introducing a cut into the resonant structure may increase loss in the suboptimal configuration such that the resonant structure develops a lower Q factor than in an optimal configuration. FIG. 4 shows an example of a resonant structure 402 with a small cut 404 at a side of the resonant structure 402. In some implementations, the cut 404 may be filled with a dielectric material, such as the dielectric material used to form a cladding in which a semiconductor gain material is suspended. In some implementations, the cut 104 may be filled with a metallic material. The cut 404 may allow for an assurance the electric field will align along a specific direction (e.g., along the NFT) for a desired optical mode. Multiple cuts, notches, or metallic nanostructures may be placed within, around, or adjacent to a resonant structure to induce localized losses of energy that are specific to some configurations (e.g., suboptimal configurations) but not others (e.g., an optimal configuration).

Figure 5:
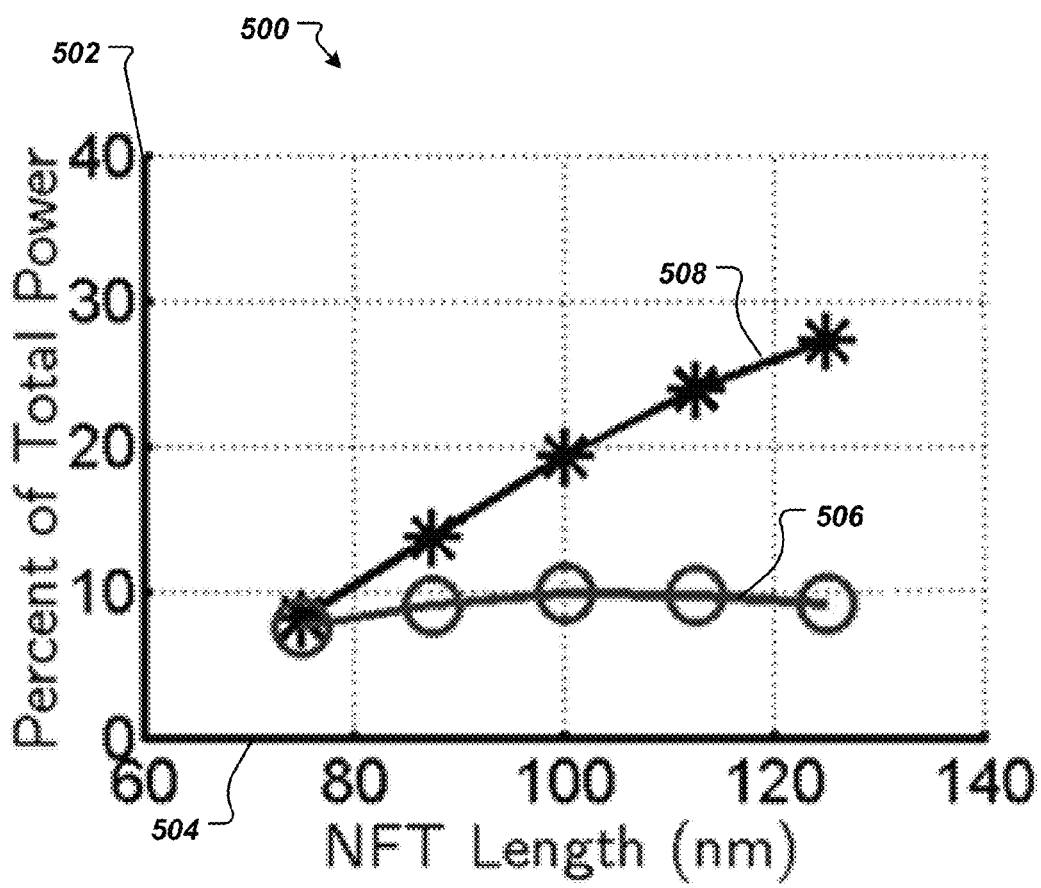
FIG. 5 is a graph showing power delivery efficiency of a resonant structure coupled with NFTs of different lengths.

FIG. 5 is a graph 500 showing power delivery efficiency of a resonant structure coupled with NFTs of different lengths. The resonant structure used to measure power delivery efficiency may have a cylindrical shape that is 2.1 μm in diameter and 255 nm in height. The NFTs may have a rectangular cross section with dimensions of 20 nm by 20 nm. The NFTs may be positioned at a side of the resonant structure, halfway between the top and bottom faces of the resonant structure (e.g., as shown in FIG. 2).

The graph 500 includes axis 502 and axis 504. Axis 502 represents the power delivery efficiency in a range between 0% and 40% of the total power stored in the resonant structure. Axis 504 represents the lengths of the NFTs in a range between 60 nm and 140 nm.

The graph 500 includes curve 506, which depicts the percent of the total system power that is dissipated in the full width half max (FWHM) cylindrical volume within a target structure. Power dissipation within the target structure may be localized to a FWHM spot size in a range between 30 nm and 40 nm (or less than 200% of the cross-sectional dimensions of the NFT). Total power is defined as power dissipated in all conductive media (e.g., the NFT and the target structure) plus the power radiated. Efficiencies of power delivery to the small resistive heating spot produced on the target structure's surface may be in a range between 6% and 10%. The efficiencies of power delivery and the FWHM spot size may make the optical device suitable for use in HAMR applications. However, higher efficiencies may be desirable for other applications.

The graph 500 includes curve 508, which depicts the power dissipated in the NFT. While the power dissipated in the NFT is larger than the power dissipated in the target structure, the heat sinking of the NFT may be superior, such that the target structure is between 3 and 5 times hotter than the NFT. A source of the superior heat sinking of the NFT may be the NFTs coupling with a resonant structure that includes dielectric material.

The optical modes associated with a resonant structure can be excited using various techniques. In some implementations, a resonant structure includes a gain material (e.g., quantum particles or dots) embedded within the resonant structure, and the resonant structure is optically pumped using an external light source. In some implementations, a resonant structure that includes gain material is electrically pumped. In some implementations, a resonant structure includes only dielectric materials, and the resonant structure is driven by evanescent coupling from a nearby dielectric waveguide. Each of these techniques will be described in further detail below.

Figure 6:
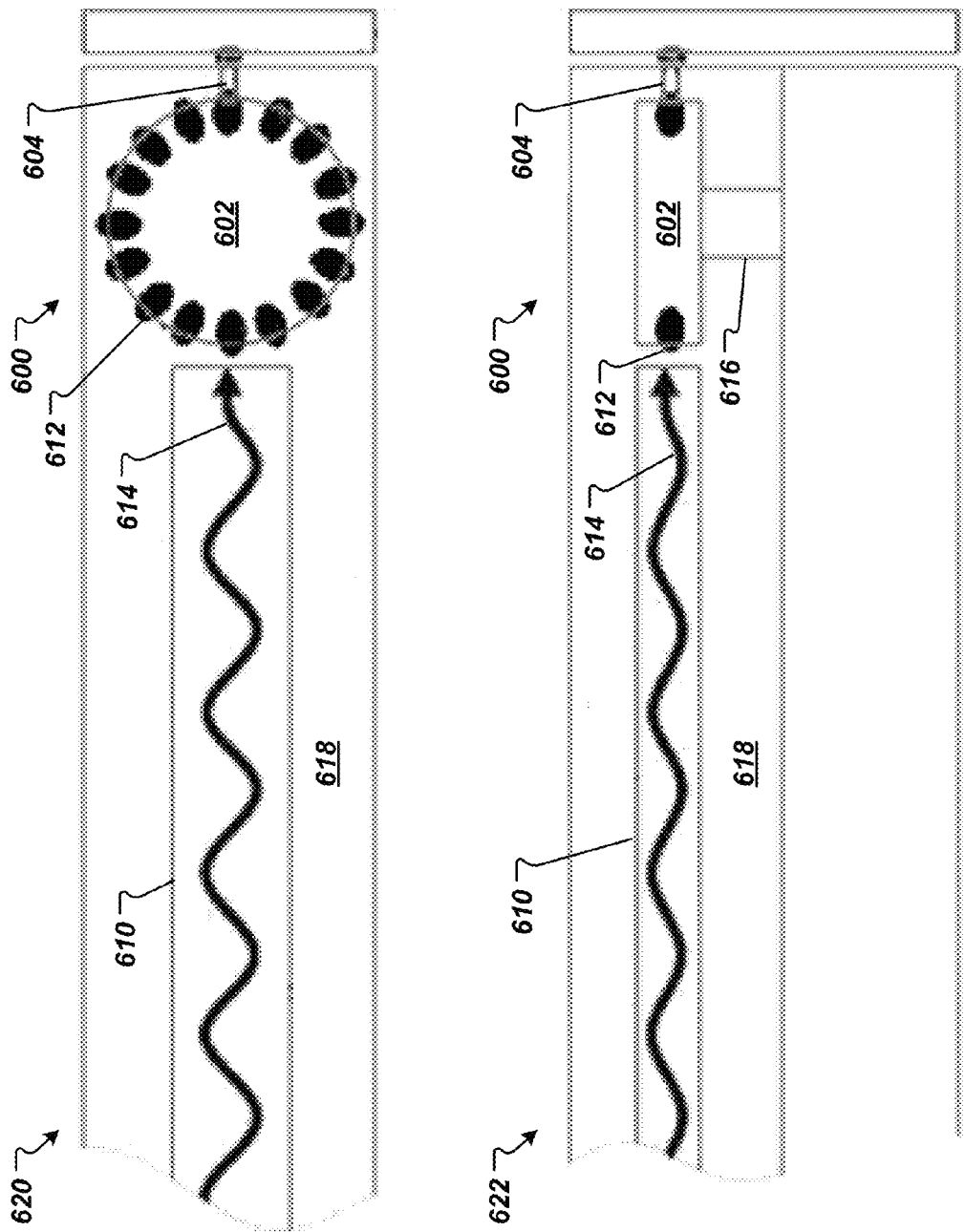
FIG. 6 is a block diagram showing a top view and a side view of an optical resonant structure coupled to a near field transducer and where the optical resonant structure is excited using an external light source.

FIG. 6 is a block diagram showing a top view 620 and a side view 622 of an optical device 600 excited using an external light source 610. The optical device 600 includes a resonant structure 602 and an NFT 604. The resonant structure 602 may be a laser cavity filled with an optical gain material, such as quantum particles or dots 612. The quantum dots 612 absorb light at one wavelength and emit light at another wavelength, e.g., the resonant wavelength of the desired mode of the resonant structure 602. The resonant structure 602 may be supported by a pedestal 616 composed of the same material as the resonant structure 602. The resonant structure 602 may be suspended in a cladding 618 of dielectric material that has a lower refractive index than the material of the resonant structure 602. By suspending as much of the resonant structure 602 as possible in the cladding 618, higher refractive index contrasts between the resonant structure 602 and the cladding 618 can be achieved, and thereby higher quality factors of the resonant structure 602 can be attained.

The quantum dots 612 are excited using an external light source 610. The external light source 610 may be a dielectric optical waveguide that provides a light 614. The light 614 propagates down the waveguide and is incident on the resonant structure 602. Embedded gain material, e.g., the quantum dots 612, within the resonant structure 602 absorb at the wavelength of the incident light 614, and emits at a wavelength that matches the wavelength of the desired optical mode of the resonant structure 602.

The dielectric optical waveguide 610 may have dimensions appropriate for allowing a large portion of light to illuminate the resonant structure 602. Using a waveguide having appropriate dimensions, sufficient absorption and re-emission of light can be achieved to drive the resonant structure 602 to the lasing condition for the optical mode for which the resonant structure 602 was designed. In this configuration, the resonant cavity operates as a microcavity laser.

Figure 7:
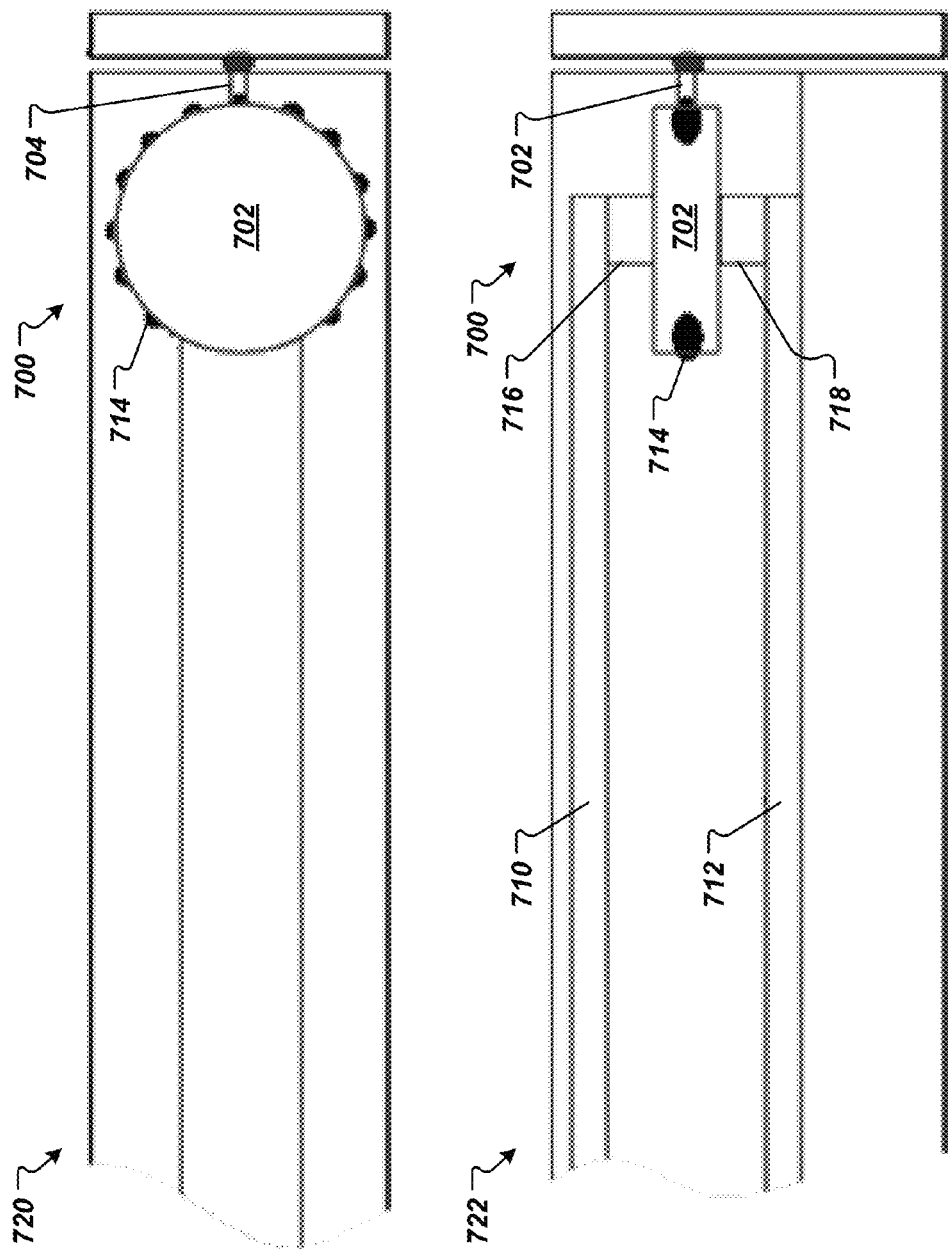
FIG. 7 is a block diagram showing a top view and a side view of an optical resonant structure coupled to a near field transducer and where the optical resonant structure is electrically pumped.

FIG. 7 is a block diagram showing a top view 720 and a side view 722 of an optical device 700 where the optical device 700 is electrically pumped. The optical device 700 includes a resonant structure 702 and a NFT 704. Electrical lead 710 is placed at the top of the resonant structure 702, and electrical lead 712 is placed at the bottom of the resonant structure 702. The electrical lead 710 may be separated from the resonant structure 702 via a recessed lead or a transparent conductor 716. The electrical lead 712 may be separated from the resonant structure 702 via a recessed lead or a transparent conductor 718.

The electrical leads 710 and 712 may be used to provide a current or a voltage to the resonant structure 702 and to drive or electrically stimulate a gain material, e.g., quantum dots 714, within the resonant structure 702 to the point of lasing. The wavelength of the photoemission from the gain material 714 is at the resonant wavelength of the desired mode of the resonant structure 702. At the point where the energy gain of the optical mode exceeds the energy loss by the resonant structure 702, strong coupling may occur between the NFT 704 and the resonant structure 702. In this configuration, the resonant structure 702 is acting as a microcavity laser.

Figure 8:
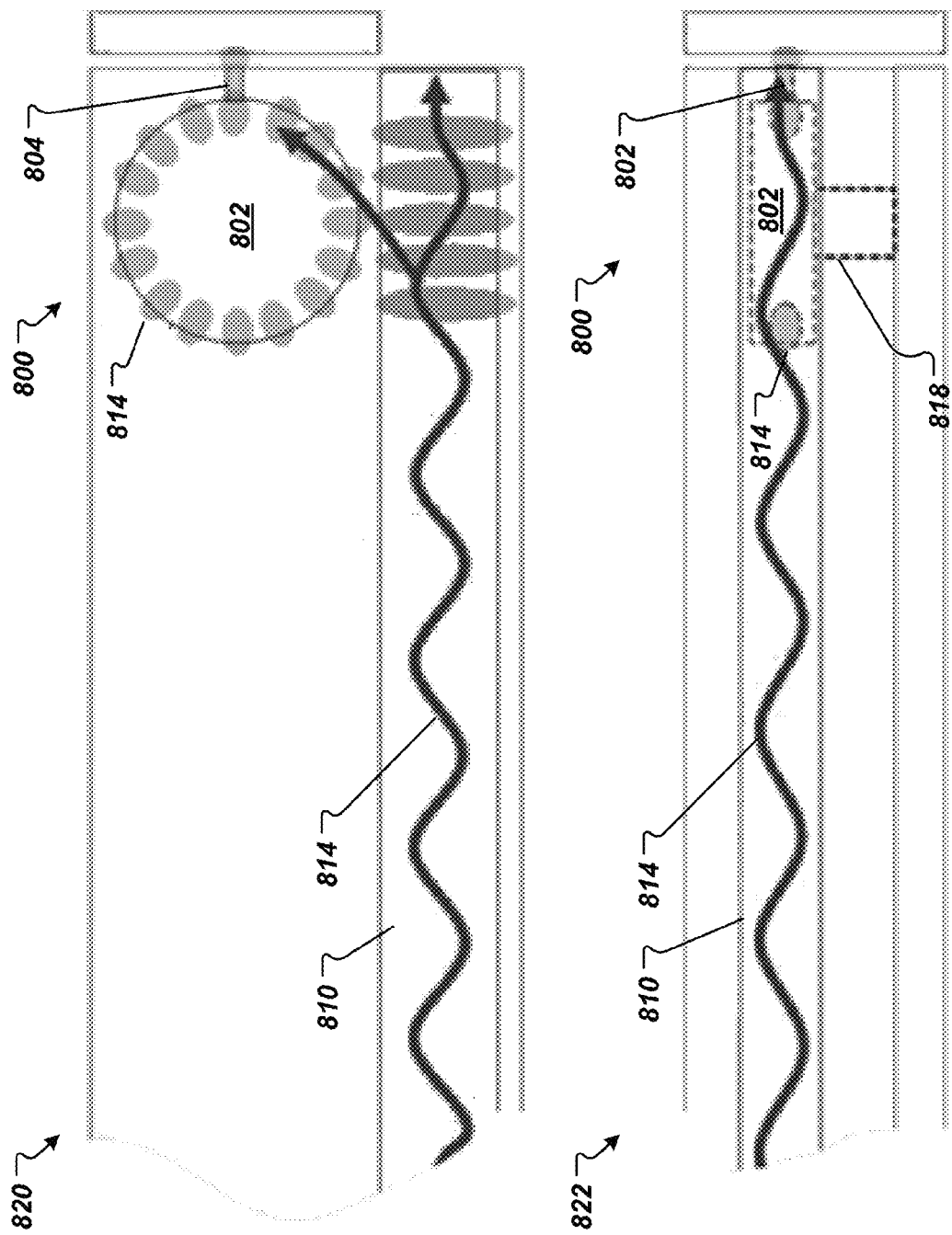
FIG. 8 is a block diagram showing a top view and a side view of an optical resonant structure coupled to a near field transducer and where the optical resonant structure is driven by evanescent coupling between an adjacent feeding optical dielectric waveguide.

FIG. 8 is a block diagram showing a top view 820 and a side view 822 of an optical device 800 where the optical device 800 is driven by evanescent coupling between an adjacent feeding optical dielectric waveguide 810. The optical device 800 includes a resonant structure 802 and a NFT 804. The resonant structure 802 includes only dielectric material. The optical mode of the resonant structure 802 is excited through an evanescent coupling process between the resonant structure 802 and the adjacent feeding optical dielectric waveguide 810. The resonant structure 802 siphons off electromagnetic energy from the waveguide 810 as light 814 within the waveguide propagates down past the resonant structure 802. The light 814 propagating down the waveguide 810 couples laterally to the resonant structure 802, and over a short time results in a buildup of the desired optical mode. The wavelength of the light 814 traveling down the waveguide 810 is the same as the resonant wavelength of the desired optical mode. Coupling between the mode of the resonant structure 802 and the mode of the waveguide 810 is achieved. In this configuration, the resonant structure 802 acts as a dielectric resonator, and is essentially a reservoir of electromagnetic energy for driving the NFT 804 placed nearby. Except for the laser that may feed the waveguide 810, this configuration is an entirely passive configuration.

Figure 9:
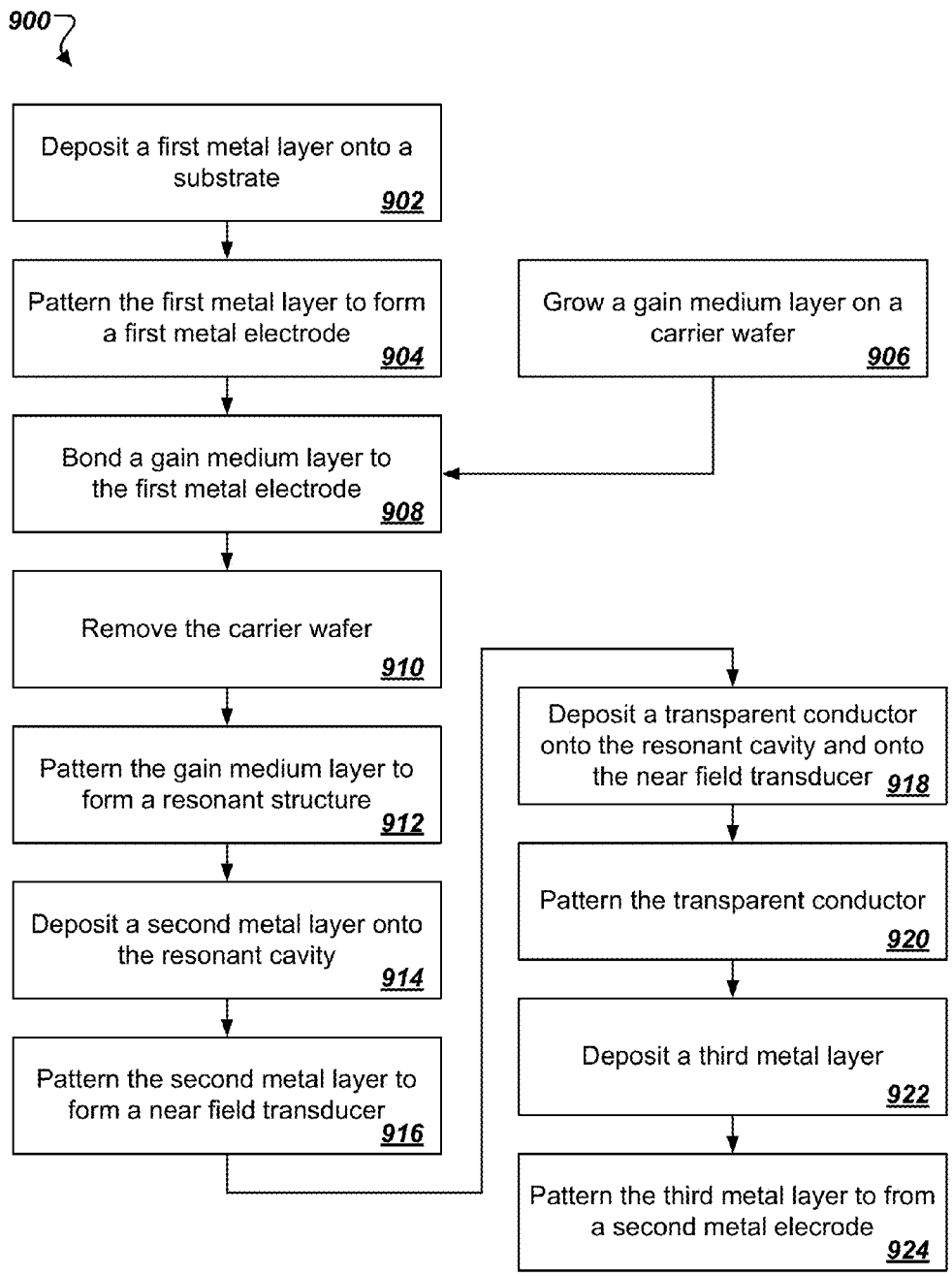
FIG. 9 is a flowchart of a process for fabricating an optical resonant structure coupled to a near field transducer.

FIG. 9 is a flowchart of a process 900 for fabricating an optical device. Briefly, the process 900 includes depositing a first metal layer onto a substrate (902), patterning the first metal layer to form a first metal electrode (904), growing a gain medium layer on a carrier wafer (906), bonding the gain medium layer to the first metal electrode (908), removing the carrier wafer (910), patterning the gain medium layer to form a resonant cavity (912), depositing a second metal layer onto the resonant cavity (914), patterning the second metal layer to form the near field transducer on at least a portion the resonant cavity (916), depositing a transparent conductor onto the resonant cavity and onto the near field transducer that is on at least the portion of the resonant cavity (918), patterning the transparent conductor (920), depositing a third metal layer on the transparent conductor (922), and patterning the third metal layer to form a second metal electrode (924).

Figure 10:
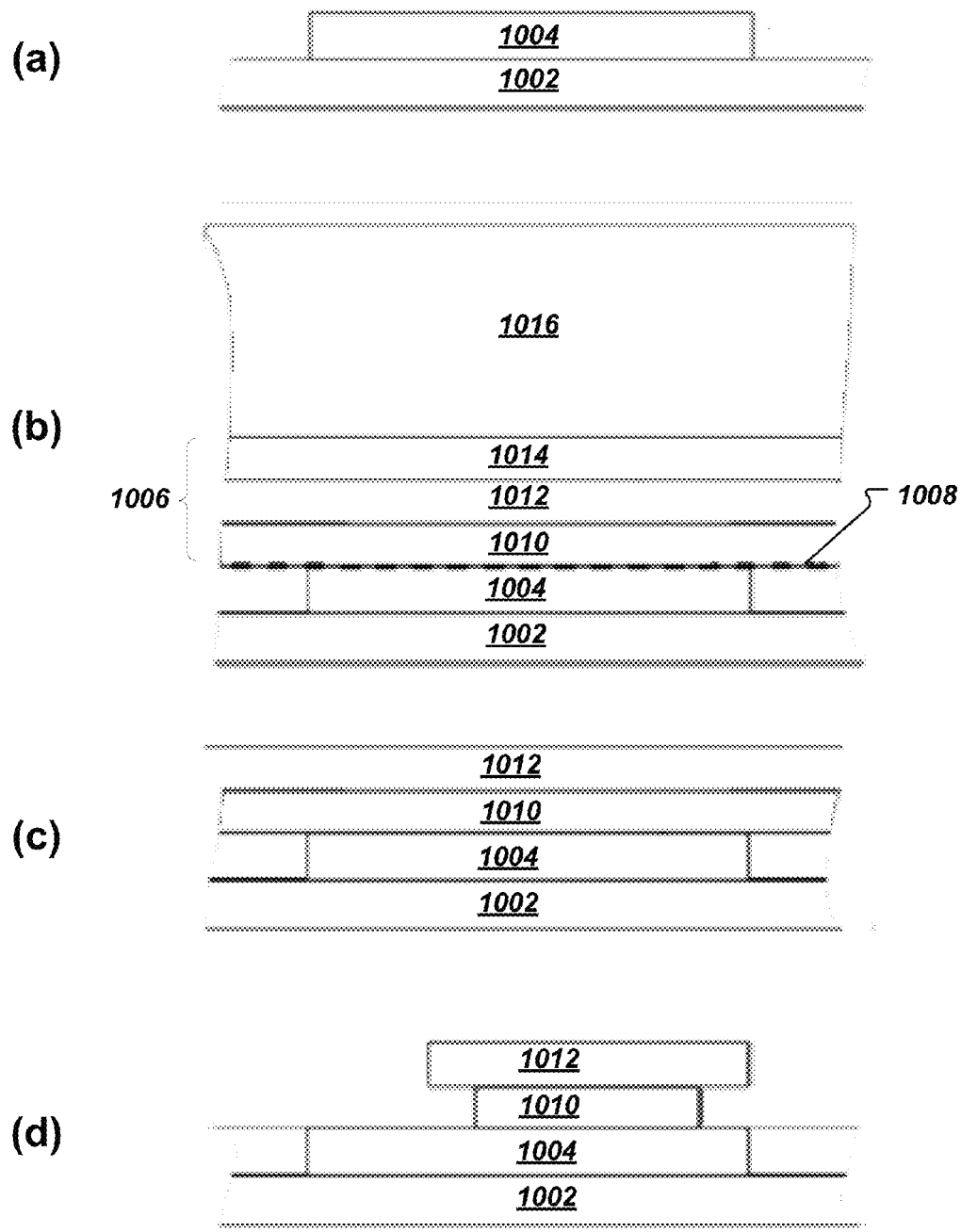
FIGS. 10 and 11 show side views of an optical resonant structure coupled to a near field transducer during different stages of fabrication.
Figure 11:
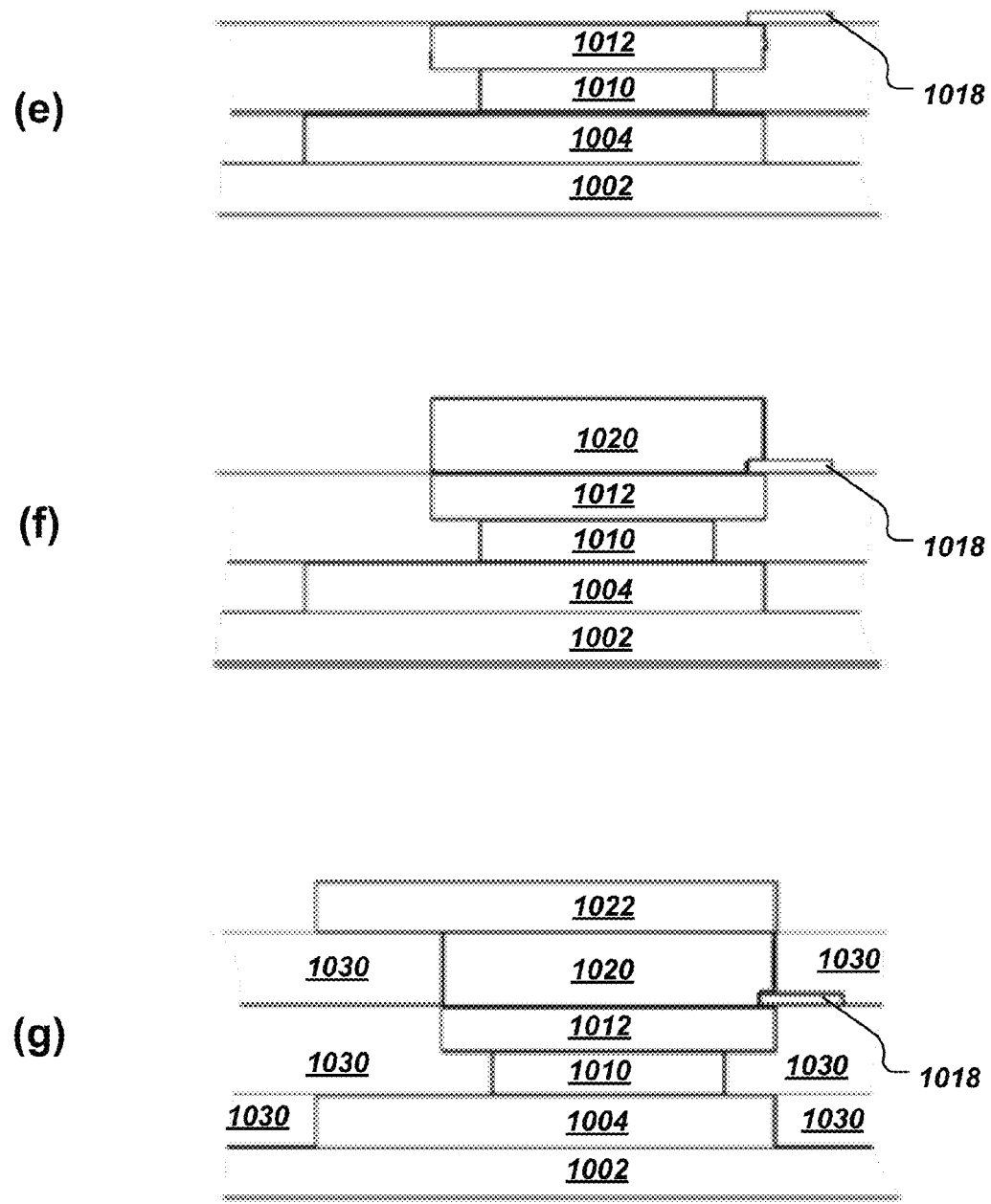

FIGS. 10 and 11 show side views of an optical device during different stages (a)-(g) of fabrication. The optical device of FIGS. 10 and 11 is an electrically driven optical device, e.g., the optical device 700 shown in FIG. 7.

At stage (a), a first metal layer is deposited onto a substrate 1002 and patterned to form a first metal electrode 1004. The first metal layer may include a metallic material, such as silver or gold.

At stage (b), a gain medium layer 1006 is joined to the first metal electrode 1004. The gain medium layer 1006 may include an electrode layer 1010, a gain material layer 1012, and a buffer layer 1014. The electrode layer 1010 may include aluminum gallium arsenide. In some implementations, the gain material layer 1012 may include a gallium arsenide matrix with indium arsenide quantum particles or dots within the matrix. In some implementations, the gain material layer 1012 may include aluminum gallium arsenide layered with gallium arsenide. The buffer layer 1014 may include aluminum gallium arsenide. In some implementations, the gain medium layer 1006 may be grown on the first metal electrode 1004. In some implementations, the gain medium layer 1006 may be grown on a carrier wafer 1016, such as a gallium arsenide substrate. The gain medium layer 1006 may be transferred through a flip chip process. The gain medium layer 1006 may be joined to the first metal electrode 1004 using a thin conductive bond 1008. Heat transfer at the gain medium layer 1006 and the first metal electrode 1004 interface is critical, so the conductive bond should not interfere with heat flow.

At stage (c), the buffer layer 1014 and the carrier substrate 1016 has been removed by, for example, etching the layers away or dissolving the buffer layer 104 and the carrier substrate 1016. Other suitable techniques are possible, for example, techniques allowing the reuse of the carrier substrate 1016.

At stage (d), the gain material layer 1012 is patterned to form a resonant structure or cavity. The electrode layer 1010 is patterned and undercut such that the gain material layer 1012 extends beyond the edges of the electrode layer 1010.

At stage (e), a second metal layer is deposited onto the resonant cavity 1012, and the second metal layer is patterned to form a near field transducer (NFT) 1018 on at least a portion the resonant cavity 1012. The second metal layer may include a metallic material, such as silver or gold. In this example, the NFT 1018 is formed on top of the resonant cavity 1012 and extending past the resonant cavity 1012. Alternatively, the NFT 1018 may be formed halfway between the top and bottom faces of the resonant cavity 1012 and in contact with a side of the resonant cavity 1012.

At stage (f), a transparent conductor 1020 is deposited and patterned. The transparent conductor 1020 may include indium tin oxide (ITO). In some implementations, a recessed metallic electrode, e.g., recessed lead 716 shown in FIG. 7, may be deposited and patterned instead of the transparent conductor 1020. At stage (g), a third metal layer is deposited and patterned to form a second metal electrode 1022.

The process 900 of FIG. 9 and the stages (a)-(g) of fabrication shown in FIGS. 10 and 11 may be performed by a fabrication device. Some intermediate steps have been omitted for clarity. For example, oxide may be deposited after each patterning step for planarization of the optical device.

Figure 12:
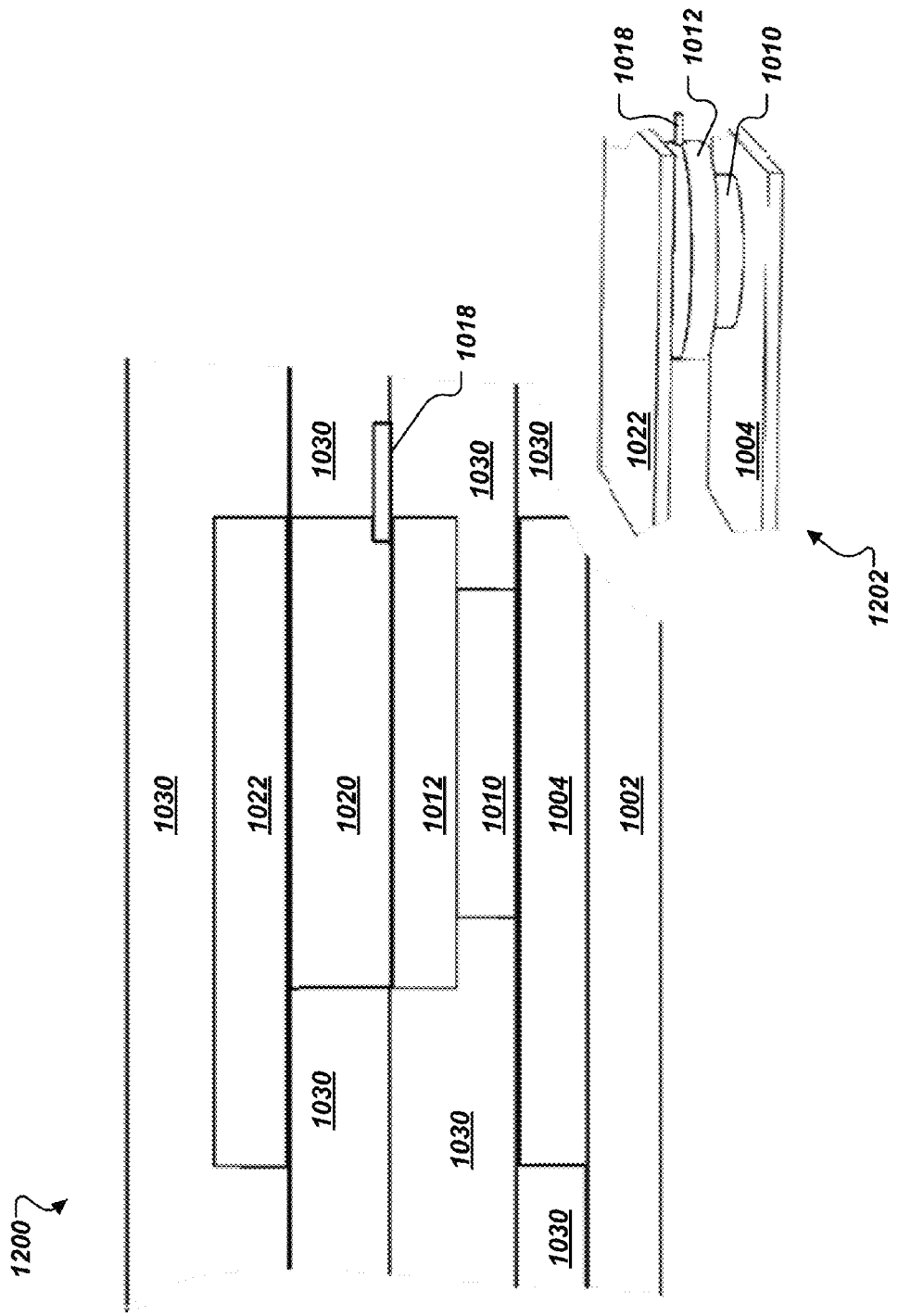
FIG. 12 is a side view and perspective view of an optical resonant structure coupled to a near field transducer.

FIG. 12 is a side view 1200 and perspective view 1202 of an optical device, e.g., the optical device shown in FIGS. 10 and 11. The optical device of FIG. 12 is an electrically driven device. The transparent conductor 1020 may act like a dielectric at optical frequencies, while being a reasonably good conductor. The electrode layer 1010 is recessed to allow the proper mode structure of the resonant cavity 1012 to develop.

A number of implementations have been described. Nevertheless, various modifications can be made without departing from the spirit and scope of the processes and techniques described herein. In addition, the processes depicted in the figures do not require the particular order shown, or sequential order, to achieve desirable results. In addition, other steps can be provided, or steps can be eliminated, from the described processes, and other components can be added to, or removed from, the describe apparatus and systems. Accordingly, other embodiments are within the scope of the following claims.

What is claimed is:

1. An optical device, comprising
   a near field transducer; and
   a dielectric resonant structure coupled to the near field transducer;
   wherein the dielectric resonant structure comprises a dielectric material that decreases a dissipation of energy in the dielectric resonant structure, relative to other dissipations of energy associated with other materials; and
   wherein the decrease in the dissipation of energy increases an efficiency of energy transfer from the near field transducer to a target structure, relative to other efficiencies of energy transfer from the near field transducer to the target structure.

2. The optical device of claim 1, wherein the near field transducer comprises one or more of a gold material, silver material, and copper material.

3. The optical device of claim 1, wherein the dielectric resonant structure comprises a first planar surface, a second planar surface, and one or more sides extending between the first planar surface and the second planar surface;
   wherein the near field transducer is coupled to at least one of the one or more sides of the dielectric resonant structure, with a longitudinal direction of the near field transducer extending perpendicularly from the at least one of the one or more sides of the dielectric resonant structure; and
   wherein a distance between the near field transducer and the first planar surface is in a range between 80% and 120% of a distance between the near field transducer and the second planar surface.

4. The optical device of claim 3, wherein the distance between the near field transducer and the first planar surface is approximately equal to the distance between the near field transducer and the second planar surface.

5. The optical device of claim 1, wherein the dielectric resonant structure comprises an exterior planar surface and the near field transducer is coupled to the exterior planar surface, and wherein a longitudinal direction of the near field transducer is substantially parallel to a plane of the exterior planar surface.

6. The optical device of claim 1, wherein the dielectric resonant structure comprises a semiconductor gain material.

7. The optical device of claim 6, wherein the semiconductor gain material comprises one or more of aluminum, gallium, indium, and arsenic.

8. The optical device of claim 7, wherein the semiconductor gain material comprises aluminum gallium arsenide layered with gallium arsenide.

9. The optical device of claim 6, wherein the dielectric resonant structure comprises one or more gaps within the semiconductor gain material, with the one or more gaps filled with the dielectric material.

10. The optical device of claim 6, wherein the dielectric resonant structure comprises one or more metallic nanostructures within or adjacent to the semiconductor gain material.

11. The optical device of claim 6, wherein the dielectric material forms a dielectric cladding having a refractive index that is lower than a refractive index of the semiconductor gain material, with the semiconductor gain material being suspended in the dielectric cladding, and with a quality factor of the dielectric resonant structure being based on a contrast between the refractive index of the dielectric cladding and the refractive index of the semiconductor gain material.

12. The optical device of claim 6, wherein the semiconductor gain material comprises a matrix and one or more quantum particles within the matrix, the matrix comprises gallium arsenide, at least one of the one or more quantum particles comprises indium arsenide, at least one of the one or more quantum particles absorbs light at a first wavelength and emits light at a second wavelength, the first wavelength differing from the second wavelength, the second wavelength comprises a wavelength corresponding to a resonant optical mode, and the dielectric resonant structure is operated at the resonant optical mode by exciting the one or more quantum particles using an external light source to provide light to the dielectric resonant structure.

13. The optical device of claim 1, wherein the dielectric material comprises one or more of silicon, silicon nitride, aluminum nitride, and tantalum oxide.

14. The optical device of claim 1, wherein the target structure is a heat assisted magnetic recording medium.

15. The optical device of claim 1, wherein the optical device comprises a microcavity laser.

16. The optical device of claim 1, further comprising:
    a first electrical lead attached to a first surface of the dielectric resonant structure; and
    a second electrical lead attached to a second surface of the dielectric resonant structure,
    with the dielectric resonant structure being operated at a resonant optical mode by providing one of a current or a voltage to the dielectric resonant structure using the first electrical lead and the second electrical lead.

17. The optical device of claim 1, wherein the dielectric resonant structure is operated at a resonant optical mode by laterally transferring electromagnetic energy to the dielectric resonant structure from a dielectric waveguide that is positioned adjacent to the dielectric resonant structure.

18. The optical device of claim 1, wherein the dielectric resonant structure is configured to operate at a resonant optical mode that excites plasmonic modes of the near field transducer to transfer energy along a longitudinal direction of the near field transducer into a region of the target structure.

19. The optical device of claim 18, wherein a wavelength of the resonant optical mode is based on a dimension of the dielectric resonant structure.

20. The optical device of claim 18, wherein the region of the target structure has an average size less than 200% of a cross-sectional size of the near field transducer.

21. The optical device of claim 17, wherein the region has an average size less than 50% of a cross-sectional size of the near field transducer.

22. The optical device of claim 19, wherein an average cross-sectional size of the near field transducer is 20 nm by 20 nm, and the average size of the region is in a range between 30 nm and 40 nm.

23. The optical device of claim 17, wherein an energy transferred along the longitudinal direction of the near field transducer is in a range between 6% and 30% of an energy produced by the dielectric resonant structure, and an energy transferred into the region is in a range between 6% to 10% of the energy produced by the dielectric resonant structure.

24. The optical device of claim 1, wherein the dielectric resonant structure has an average thickness of 255 nm and an average diameter of 2.1 microns.

25. The optical device of claim 1, wherein the dielectric resonant structure comprises a resonant cavity.

26. The optical device of claim 1, wherein the dielectric material has an average refractive index greater than 1.50.

27. A method for fabricating an optical device, the method comprising:
    depositing a first metal layer onto a substrate;
    patterning the first metal layer to form a first metal electrode to electrically drive the optical device;
    bonding a gain medium layer to the first metal electrode;
    patterning the gain medium layer to form a resonant cavity, wherein the resonant cavity comprises a material that decreases a dissipation of energy in the resonant cavity, relative to other dissipations of energy associated with other materials, wherein the decrease in the dissipation of energy increases an efficiency of energy transfer from a near field transducer to a target structure, relative to other efficiencies of energy transfer from the near field transducer to the target structure, and wherein the material comprises one or more of a dielectric material and a gain material;
    depositing a second metal layer onto the resonant cavity;
    patterning the second metal layer to form the near field transducer on at least a portion the resonant cavity;
    depositing a transparent conductor onto the resonant cavity and onto the near field transducer that is on at least the portion of the resonant cavity;
    patterning the transparent conductor;
    depositing a third metal layer on the transparent conductor; and
    patterning the third metal layer to form a second metal electrode to electrically drive to optical device.

28. The method of claim 27, wherein the gain material comprises a semiconductor material.

29. The method of claim 28, wherein the semiconductor material comprises one or more of aluminum, gallium, indium, and arsenic.

30. The method of claim 27, wherein the dielectric material comprises one or more of silicon nitride and tantalum oxide.

31. The method of claim 27, wherein the gain medium layer comprises a gallium arsenide matrix with indium arsenide quantum particles.

32. The method of claim 27, further comprising:
    growing the gain medium layer on a carrier wafer; and
    removing the carrier wafer after bonding the gain medium layer to the first metal electrode.

33. The method of claim 27, wherein bonding the gain medium layer to the first metal electrode comprises bonding the gain medium layer using a thin conductive bond.

34. The method of claim 27, wherein the transparent conductor comprises indium tin oxide.

35. The method of claim 27, wherein the method is performed by a fabrication device.

36. An optical device, comprising
    a near field transducer comprising a gold material and having average cross-sectional dimensions of 20 nm by 20 nm; and
    a resonant cavity coupled to the near field transducer, with the resonant cavity having an average diameter in a range of 1 micrometer to 100 micrometers and having an average thickness of less than 1 micrometer, the resonant cavity comprising a dielectric cladding and an optical gain medium suspended in the dielectric cladding, the optical gain medium comprising a gallium arsenide matrix and indium arsenide quantum particles, and the resonant cavity configured to operate at a resonant optical mode that excites plasmonic modes of the near field transducer to transfer energy along a longitudinal direction of the near field transducer into a region of a heat assisted magnetic recording medium, the region having an average diameter in a range between 30 nm and 40 nm.

* * * * *

UNITED STATES PATENT AND TRADEMARK OFFICE
CERTIFICATE OF CORRECTION

PATENT NO. : 9,246,549 B2
APPLICATION NO. : 13/969307
DATED : January 26, 2016
INVENTOR(S) : James A. Bain et al.

Page 1 of 1

It is certified that error appears in the above-identified patent and that said Letters Patent is hereby corrected as shown below:

In the claims,

Col. 14, line 3, claim 27, after "portion" insert -- of --

Signed and Sealed this
Twenty-fourth Day of May, 2016

Michelle K. Lee
*Director of the United States Patent and Trademark Office*